A. SCHERBIUS.
BUFFER MACHINE FOR ALTERNATING CURRENT SYSTEMS.
APPLICATION FILED JUNE 27, 1908.
1,167,119.  Patented Jan. 4, 1916.
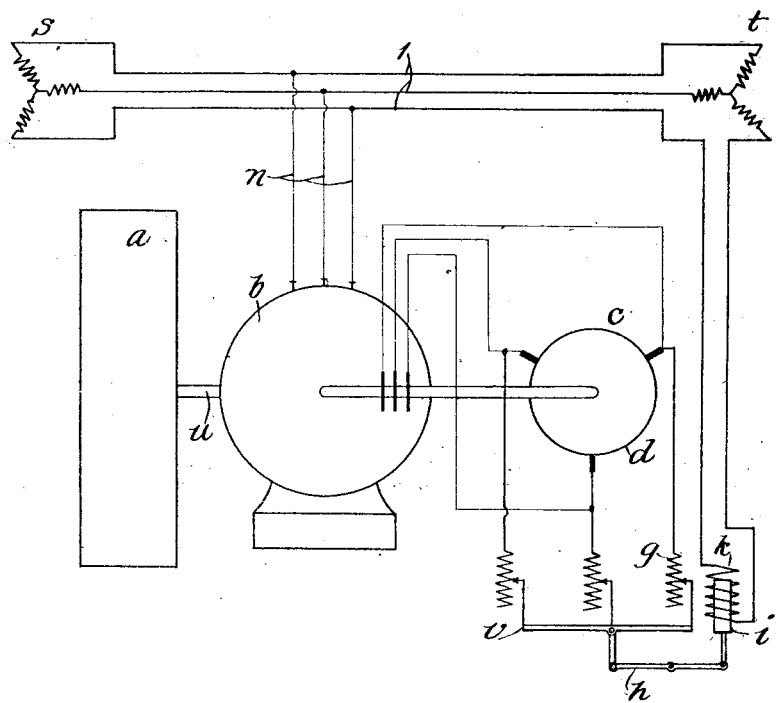
Witnesses:
L. Waldman
C. Huymann
Inventor:
Arthur Scherbius
by B. Singer Attorney

UNITED STATES PATENT OFFICE.

ARTHUR SCHERBIUS, OF BADEN, SWITZERLAND, ASSIGNOR TO GENERAL ELECTRIC COMPANY, A CORPORATION OF NEW YORK.

BUFFER-MACHINE FOR ALTERNATING-CURRENT SYSTEMS.

1,167,119.     Specification of Letters Patent.     Patented Jan. 4, 1916.

Application filed June 27, 1908. Serial No. 440,694.

*To all whom it may concern:*

Be it known that I, ARTHUR SCHERBIUS, a citizen of the Swiss Confederation, and resident of Baden, Switzerland, have invented certain new and useful Improvements in Buffer-Machines for Alternating-Current Systems, of which the following is a specification.

This invention relates to buffer sets designed for use in connection with power systems in order to relieve the system from excessive variations of load.

The use of an asynchronous alternating current machine coupled with a fly-wheel and connected to an alternating current system of distribution as a buffer set is well known. Such sets are so designed that when the load on the system is light, electrical energy will be transformed to mechanical energy and stored in the fly-wheel, while when the load on the system is heavy a retransformation will take place and the fly-wheel give up its energy and return electrical energy to the system. These arrangements depend on the characteristic of an asynchronous machine that it will operate as either a motor or generator. All such schemes must, however, be so designed that the frequency of the current returned is substantially the same as that of the system, but we know that in order that the fly-wheel shall give up mechanical energy, a decrease in its speed is necessary, and such a change in speed would mean a change in frequency. Heretofore the difficulty has been avoided and the result accomplished by changing the connections of the primary of the asynchronous machine so that the number of poles is changed, or by using two machines which may be connected in cascade, so that in either case the synchronous speed will be lowered and the fly-wheel will be able to drive the set above synchronism and cause the machine to act as a generator and deliver energy of the proper frequency. These arrangements have the disadvantage, however, that the change from motor to generator action is accompanied by a considerable shock, or else a substantial part of the energy must be consumed in resistances to avoid these shocks.

The object of my invention is, therefore, to devise a buffer set capable of receiving energy from an alternating current system of distribution, and returning it again to the system with the proper frequency at all speeds, which shall operate efficiently and without substantial shocks. To this end I provide a buffer set comprising a flywheel, an asynchronous machine usually constructed as an induction motor and a commutator machine mounted on the same shaft, the commuted winding of the commutator machine being connected to the secondary winding of the induction motor, the primary winding of which is connected to the mains, so that the buffer set at times takes energy from the line and at times gives energy to the line.

The accompanying drawing shows diagrammatically by way of example one arrangement according to the present invention in which the operation of the buffer machine is controlled automatically.

In the form of the invention illustrated in the drawing a three phase system is shown having a generating station $s$ connected by leads $l$ to a load $t$. The buffer set comprises an induction motor $b$ whose rotor is mounted on the shaft $u$ on which is mounted a flywheel $a$ and the rotor of a commutator machine $c$. The commuted winding of the commutator machine is electrically connected to the secondary winding of the induction motor $b$ through suitable slip rings. The commutator machine $c$ may be controlled in any suitable manner to cause the induction motor to work as a motor or generator and for example may be excited by windings $g$ from its own terminals, the number of which windings may be controlled by a conductive contact device $v$ mounted on one arm of a lever $h$, the other arm of which may be connected with a solenoid core $i$ operable by the solenoid $k$ fed from the mains $l$. Controlling a commutator machine by varying the number of its acting field coils is known and forms no part of the present invention.

The buffer arrangement is connected to the system by the leads $n$ which join the mains $l$ to the primary winding of the induction motor $b$. The operation of such an arrangement may be considered as follows: Assume that the switches of the load $t$ are open, or otherwise that there is no load on the line due to $t$, and that the buffer set is at rest. Current now being supplied from the station *s* will flow by way of the leads *l* and *n* to the induction motor *b*. This will effect gradual starting of the rotor of the induction motor *b*, and the same together with the shaft *u*, the flywheel *a* and the rotor of the commutator machine *c* will gradually accelerate until assuming that there are no turns acting in the field windings *g* the rotor is running at a speed just below the synchronous speed. During this starting and acceleration of the buffer set the current in the leads *n* rises momentarily and then gradually falls to a constant value. Assume now that the load is suddenly applied at *t*: The current in the mains *l* will quickly rise, will draw up the core *i* because of the solenoid *k* and will thus introduce a certain proportion of the field windings *g*. Because of this and because at this time the shaft *u* and the rotor *d* of the machine *c* are rotating current will be generated by the commutator machine, and instead of having the effect of a small resistance in series with the secondary winding of the induction motor, will become a source of E. M. F. opposing the slip E. M. F. generated in the secondary winding of the induction motor. This will mean that the net E. M. F. in the circuit including the secondary winding of the induction motor and the commuted winding of the commutator machine will be diminished, and less current will flow therein. Considering the induction motor as a transformer, which for this purpose it can be considered, it will be seen that less current will, therefore, be supplied to the primary of the induction motor by the station *s*. With greater loads core *i* would so move that enough turns of the field winding *g* would be inserted in circuit that an E. M. F. would be generated in the commuted winding of the commutator machine greater than the E. M. F. induced in the secondary of the induction motor. The resulting E. M. F. in the secondary winding will cause a flow of current in the opposite direction or 180° out of phase with that which flowed therein during motor action, and cause the asynchronous machine *b* to act as a generator delivering current to the system. Again looking on the induction motor as a transformer, it will be clear that the normal secondary now acts as a primary winding, and the normal primary as the secondary, whereupon current is delivered to the lines through the leads *n*, and so assists the station in supplying the load demand. This condition of affairs will obtain until the station can supply the demand or until the load is reduced, or until the energy of the flywheel set is expended. It will, therefore, be seen that the flywheel set acts as a buffer between the station and the load, absorbing power at times, absorbing less power at other times and generating power which has been stored in it at other times, according as the load varies.

It will be understood that because a commutator machine is employed in the forms illustrated the frequency of the current which it generates at any instant is equal to the frequency of the current in its field coils and, therefore, the generated current is always of proper frequency to assist or counteract the current supplied to or taken from the secondary of the induction motor. When the induction motor acts as a generator the line will be fed by a current of proper frequency because the commutator machine will be excited by current from the secondary of the induction motor of a frequency determined by the slip or, in other words, by the line frequency and the speed of the rotor. Just as when any asynchronous machine is driven above synchronous speed and feeds energy back to the line, the exciting currents are supplied from the line and the frequency is determined by the line frequency, so here the exciting currents for both the asynchronous machine and the commutator machine are derived from the line and hence have a frequency such that the frequency of the commutator machine and of the asynchronous machine acting as generators is correct, regardless of the speed of the fly-wheel or of the commutator machine. It will be understood also that it is not essential to operate the number of acting field coils by a relay or automatic device as is shown, but any suitable means may be employed, also the number of turns acting in the field need not be varied but any other suitable means may be employed for controlling the commutator machine as by varying the number of ampere turns acting, or for rotating the brushes or the like.

I conceive that various modifications of the particular device herein described might be made, and I, accordingly, do not desire to be limited to the exact arrangement shown and described, but seek to cover in the appended claims all those modifications which fall within the scope and spirit of my invention.

Having now described my invention what I claim as new and desire to secure by Letters Patent is:—

A buffer set for equalizing the load on a system of distribution, comprising an asynchronous machine, a dynamo electric commutator machine, and a fly-wheel, the rotor of said asynchronous machine being mechanically connected to said fly-wheel, the primary winding of said asynchronous machine being electrically connected to said system, the secondary winding of said asynchronous machine being connected in cascade with the commuted winding of said commutator machine, and means responsive to the load on said system for varying the voltage generated by said commutator machine in such a manner that said asynchronous machine will deliver electrical energy to said system of distribution upon an increase in the load on said system and will receive energy therefrom upon a decrease in such load.

In testimony whereof I have hereunto set my hand in presence of two witnesses.

ARTHUR SCHERBIUS.

Witnesses:
 GEO. C. LEBER,
 A. LIEBEKKNECHT.